United States Patent [19]
Aono et al.

[11] Patent Number: 5,299,320
[45] Date of Patent: Mar. 29, 1994

[54] PROGRAM CONTROL TYPE VECTOR PROCESSOR FOR EXECUTING A VECTOR PIPELINE OPERATION FOR A SERIES OF VECTOR DATA WHICH IS IN ACCORDANCE WITH A VECTOR PIPELINE

[75] Inventors: Kunitoshi Aono, Hirakata; Masaki Toyokura, Katano; Toshiyuki Araki, Yawata; Akihiko Ohtani, Moriguchi; Hisashi Kodama, Osaka; Kiyoshi Okamoto, Moriguchi all of Japan

[73] Assignee: Matsushita Electric Industrial Co., Ltd., Osaka, Japan

[21] Appl. No.: 752,787

[22] Filed: Aug. 30, 1991

[30] Foreign Application Priority Data

Sep. 3, 1990 [JP] Japan .................. 2-233535

[51] Int. Cl.⁵ .............................. G06F 9/30
[52] U.S. Cl. .................... 395/375; 395/200; 395/800; 364/232.21; 364/232.8; 364/DIG. 1; 364/DIG. 2
[58] Field of Search .............. 395/800, 425, 375, 775, 395/575, 550, 250; 364/DIG. 1, DIG. 2, 200

[56] References Cited
U.S. PATENT DOCUMENTS

| | | | |
|---|---|---|---|
| 4,566,063 | 1/1986 | Zolnowsky et al. | 395/375 |
| 4,598,358 | 7/1986 | Boddie et al. | 395/375 |
| 4,954,968 | 9/1990 | Yamaguchi et al. | 395/112 |

OTHER PUBLICATIONS

"Am2909 . Am2911 . Am2909A . Am2911A Microprogram Sequencers", pp. 2-120-2-134. Advanced Micro Devices Data Sheet Dec. 1979.

Primary Examiner—Alyssa H. Bowler
Assistant Examiner—Dzung C. Nguyen
Attorney, Agent, or Firm—Wenderoth, Lind & Ponack

[57] ABSTRACT

In a program control type processor for executing plural instructions including a vector pipeline instruction including a data processor for executing a pipeline operation, there is provided a program controller including a program memory, a program counter and a decoder, and is further provided an address generator and a data memory. When the vector pipeline instruction is read out from the program memory and is decoded by the decoder, the program controller stops the program counter and outputs a start signal, and thereafter, controls an operation of the data processor according to the contents of the vector pipeline instruction. The data processor executes the pipeline operation for the data outputted from the data memory by being controlled by the program controller, and the program controller detects completion of the pipeline operation performed in response to the vector pipeline instruction a predetermined number of cycles after receiving the end signal, and thereafter, sequentially executes instructions following the vector pipeline instruction.

2 Claims, 8 Drawing Sheets

PROGRAM CONTROL TYPE VECTOR PROCESSOR FOR EXECUTING A VECTOR PIPELINE OPERATION FOR A SERIES OF VECTOR DATA WHICH IS IN ACCORDANCE WITH A VECTOR PIPELINE

BACKGROUND OF THE INVENTION

1. Field of the Invention

The present invention relates to a program control type processor, and more particularly, to a program control type processor such as a microprocessor, a digital signal processor (referred to as a DSP hereinafter), which executes a vector pipeline instruction.

2. Description of the Prior Art

In a conventional program control type processor for general use such as a RISC type processor, there is provided as sets of micro instructions, groups of instructions such as instructions for reading out data from a memory, writing data in a memory, setting data in a register, transferring data from a register to another register, and various kinds of arithmetic and logical operations. Various kinds of processes are executed according to a program composed of these instructions. Almost all of the instructions are instructions for instructing only one operation. Complicated and high grade processes can be executed by combining plural operations of these instructions, thereby obtaining a processing for general use.

However, since it is necessary to sequentially execute plural operations of these instructions one by one in the conventional program control type processor, there is a problem in that the processing speed of the processor is relatively low.

In particular, in a conventional DSP for executing arithmetic operations, in order to execute operations at a high speed, there is further provided a multiplier, a program memory, data memories which are separated and divided, data bus and address bus which are separated and divided, as compared with microprocessor for general use. However, in the conventional DSP, a processing is programmed using plural operations of these instructions and these instructions are sequentially executed one by one, as well as in the conventional microprocessor for general use. When a necessary processing speed is not obtained in a program control type DSP, it is necessary to respectively make hardware for particular exclusive uses.

SUMMARY OF THE INVENTION

The object of the present invention is therefore to provide a program control type vector processor capable of executing a vector pipeline instruction.

Another object of the present invention is to provide a program control type vector processor comprising pipeline operators which is capable of executing plural instructions at a speed higher than that of a conventional program control type processor.

In order to achieve the aforementioned objective, according to one aspect of the present invention, there is provided a program control type vector processor for executing plural instructions including a vector pipeline instruction, comprising:

a data processor for executing a pipeline operation for vector data comprised of a series of data based on said vector pipeline instruction;

a program controller including a program memory, a program counter and a decoder, said program controller stopping said program counter and outputting a start signal when said vector pipeline instruction is read out from said program memory and is decoded by said decoder, and thereafter, controlling an operation of said data processor according to contents of said vector pipeline instruction;

an address generator for sequentially generating addresses according to a preset sequence in response to said start signal and for outputting an end signal to said program controller when completing generation of a predetermined number of addresses; and a data memory for storing data and outputting vector data comprised of a series of data based on an address which is generated by said address generator;

wherein said data processor executes said pipeline operation for the vector data outputted from said data memory under the control of said program controller;

and wherein said program controller detects completion of said pipeline operation performed in response to said vector pipeline instruction a predetermined number of cycles after receiving said end signal, and thereafter, sequentially executes instructions following said vector pipeline instruction;

said program control type processor further comprising:

a branch address controller for generating a branch address in response to a decoded result of said decoder;

a vector instruction controller for controlling respective circuits of said program controller in response to said decoded result of said decoder and said end signal;

an instruction register circuit for temporarily storing data outputted from said program memory in response to a second control signal outputted from said vector instruction controller; and a first pipeline register for temporarily storing data outputted from said decoder and outputting said stored data to said data memory and said data processor;

said program counter comprises:

a counter register for temporarily storing an address to be outputted to said program memory;

an incrementer for increasing by one an address outputted from said program counter register every one cycle of an operation clock and for outputting the increased address; and a first multiplexer for selecting either one of outputs of said branch address controller, said program counter register and said incrementer according to a first control signal outputted from said vector instruction controller and for outputting said selected address through said program counter register to said program memory;

said instruction register circuit comprising:

a second pipeline register for temporarily storing data to be outputted to said decoder; and a second multiplexer for selecting either one of outputs of said program memory and said second pipeline register according to a second control signal outputted from said vector instruction controller and for outputting said selected one through said second pipeline register to said decoder; and wherein when said vector pipeline instruction is decoded by said decoder, said vector instruction controller outputs said start signal to said address generator, controls said first multiplexer to select the output of said program counter register so that said program counter register self-holds data, and controls said second multiplexer to select the output of said second pipeline register so that said second pipeline register self-holds data, thereby controlling said address generator, said data memory and said data processor to sequentially execute respective instructions of said vector pipeline instruction, thereafter, at a timing delayed by predetermined cycles from a timing when receiving said end signal from said address generator, said vector instruction controller detects completion of said pipeline operation performed based on said vector pipeline instruction, and then, said vector instruction controller stops said control of said first and second multiplexers, thereby stopping said self-holding of said program counter register and said self-holding of said second pipeline register, and thereafter, said program controller sequentially executes instructions following said vector pipeline instruction;

said address generator comprising a source memory address generator and a destination memory address generator;

said vector instruction controller comprising:

a first start signal generator for setting a start signal for said source memory address generator in response to a vector instruction signal outputted from said decoder when said vector pipeline instruction is decoded by said decoder and for outputting said set start signal to said source memory address generator, and for resetting said start signal for said source memory address generator in response to said end signal outputted from said address generator;

a second start signal generator including a first shift register having predetermined plural stages of delay circuits for delaying said vector instruction signal and for outputting said delayed vector instruction signal, and a third multiplexer for selecting either one of outputs of said delay circuits of said first shift register according to a vector instruction sort signal of a decoded result which is obtained when said vector pipeline instruction is decoded by said decoder and for outputting said selected one as a start signal for said destination memory address generator to said destination memory address generator;

a first control signal generator including a second shift register having predetermined plural stages of delay circuits for delaying said end signal and for outputting delayed end signal, a fourth multiplexer for selecting either one of outputs of said delay circuits of said second shift register according to said vector instruction sort signal and for outputting said selected one as a delayed end signal, and a signal generating circuit for setting said second control signal in response to said vector instruction signal, and for outputting said set second control signal to said second multiplexer, and for resetting said second control signal in response to said delayed end signal outputted from said fourth multiplexer; and a second control signal generator for generating said first control signal in response to said second control signal and an address branching control signal of a decoded result which is obtained when an address branching instruction is decoded by said decoder, and for outputting said generated first control signal to said first multiplexer.

According to a still further aspect of the present invention, in said program control type processor, said address generator comprises:

an address operator for sequentially generating addresses in response to said start signal and outputting said generated address to said data memory;

a cycle counter for counting a number of addresses generated by said address operator; and an end judgment circuit for outputting said end signal to said program controller when the number of the addresses counted by said cycle counter becomes a predetermined value.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

The preferred embodiment according to the present invention will be described below with reference to the attached drawings.

Figure 1:
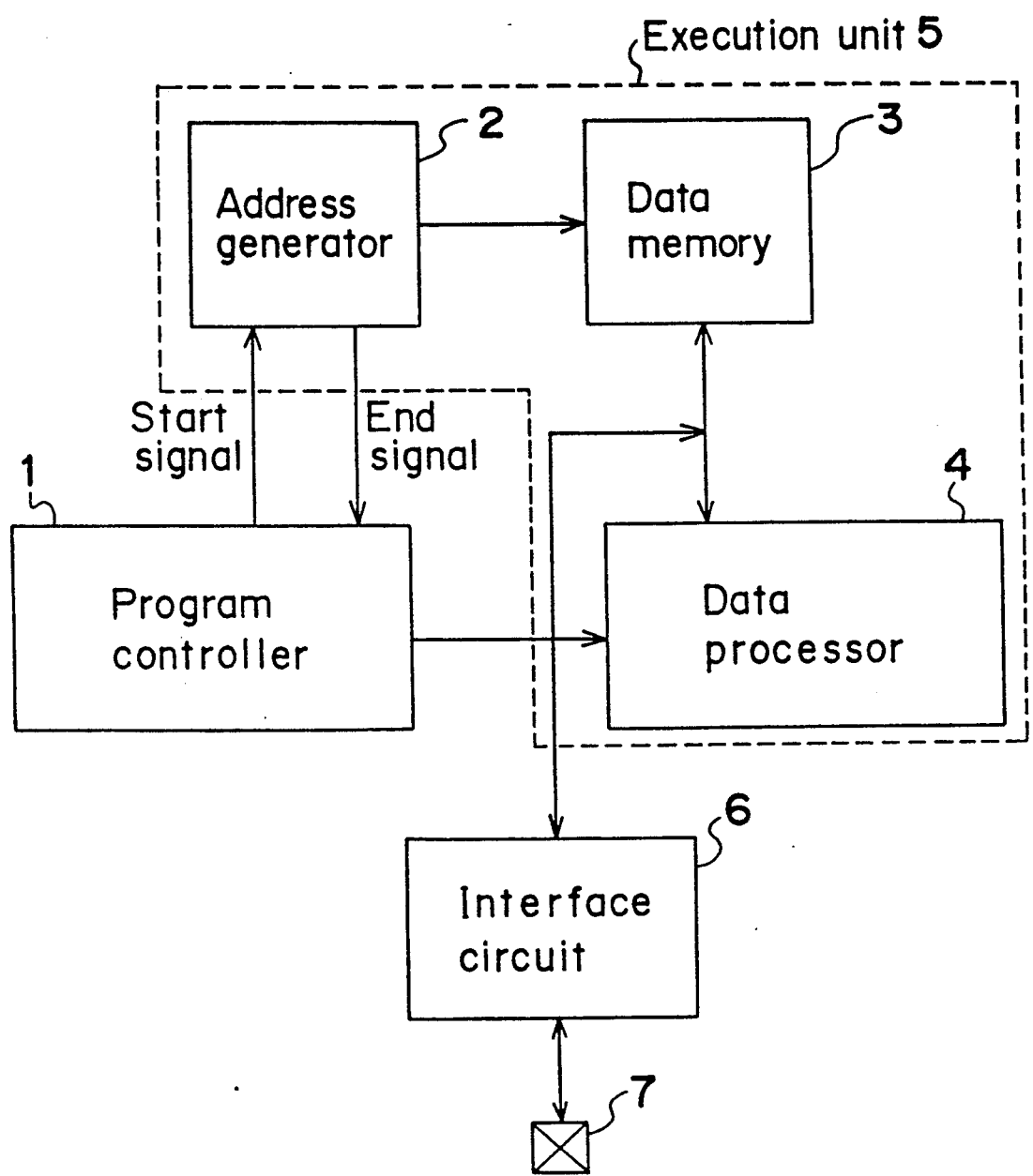
FIG. 1 is a schematic block diagram showing a program control type processor of a preferred embodiment according to the present invention.

FIG. 1 shows a program control type processor of a preferred embodiment according to the present invention. In the program control type processor of the present preferred embodiment, there is provided vector pipeline instructions in addition to sets of instructions of the conventional program control type processor.

Referring to FIG. 1, the program control type processor comprises a program controller 1, an execution unit 5, an interface circuit 6 and input and output terminals 7. The execution unit 5 comprises an address generator 2, a data memory 3 and a data processor 4.

Figure 3:
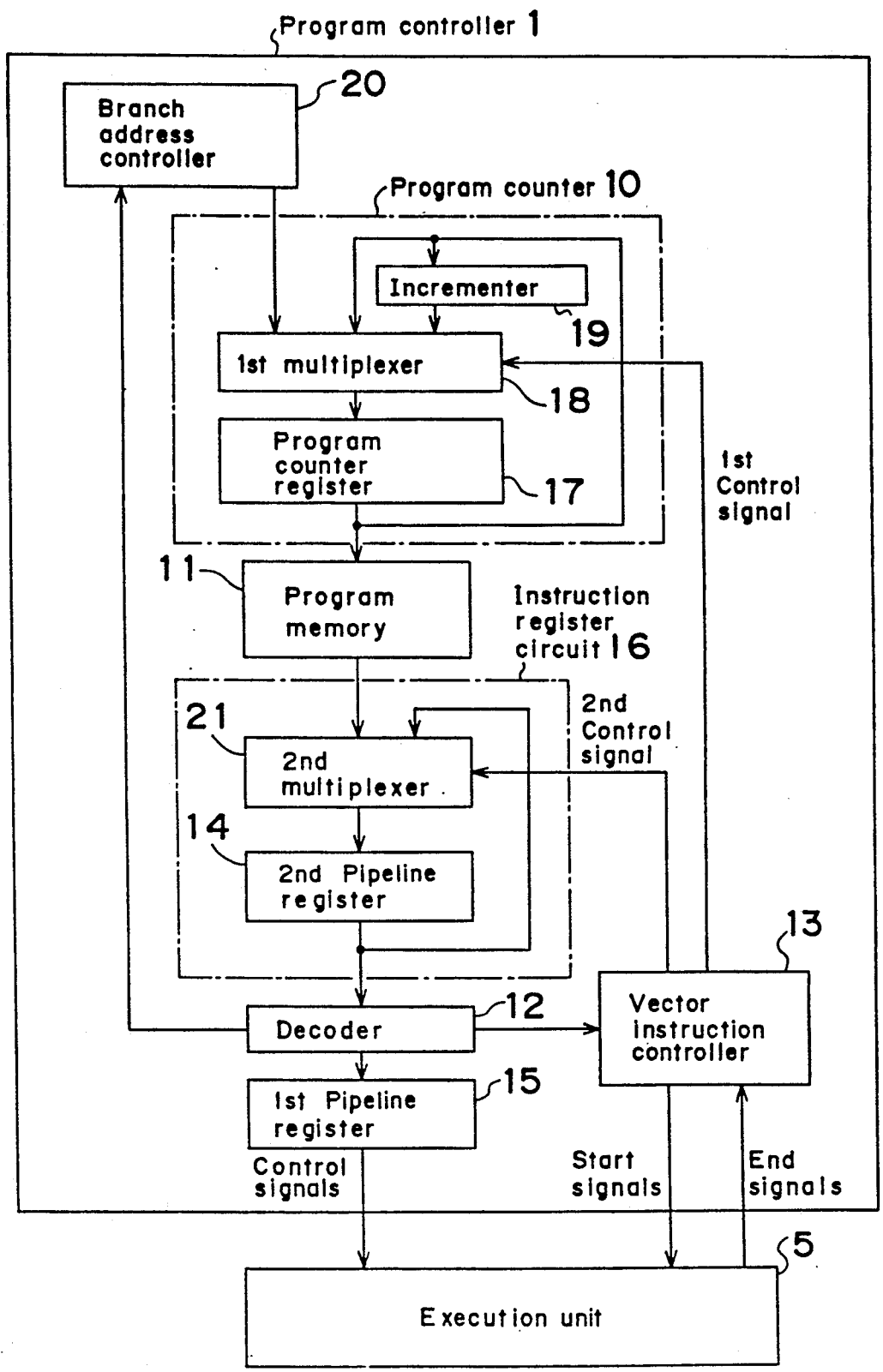
FIG. 3 is a schematic block diagram showing a program controller shown in FIG. 1.

The program controller 1 includes a program memory 11, a program counter 10, and a decoder 12, as shown in FIG. 3. When the above-mentioned vector pipeline instruction is read out from the program memory 11, the program controller 1 stops the program counter 10 and outputs a start signal to the address generator 2. Thereafter, the program controller 1 controls the data processor 4 according to the contents of the vector pipeline instruction. In response to the start signal outputted from the program controller 1, the address generator 2 continuously generates addresses independent of the program controller 1 according to a preset sequence, and thereafter, when generation of a predetermined number of the addresses has been completed, the address generator 2 outputs an end signal to the program controller 1. In response to an address generated by the address generator 2, the data memory 3 outputs data stored at the inputted address to the data processor 4. In response to data read out from the data memory 3, the data processor 4 executes a pipeline operation, and outputs the processed data such as calculation data to an external unit through the interface circuit 6 and the input and output terminals 7.

An operation of the program control type processor shown in FIG. 1 will be described below with reference to a timing chart of FIG. 2, in which such an operation is shown that the program controller 1 sequentially reads out instructions stored in the program memory 11 and executes the read instructions. The features of the present preferred embodiment is to provide a vector pipeline instruction for executing a pipeline process in the program control type processor.

Figure 2:
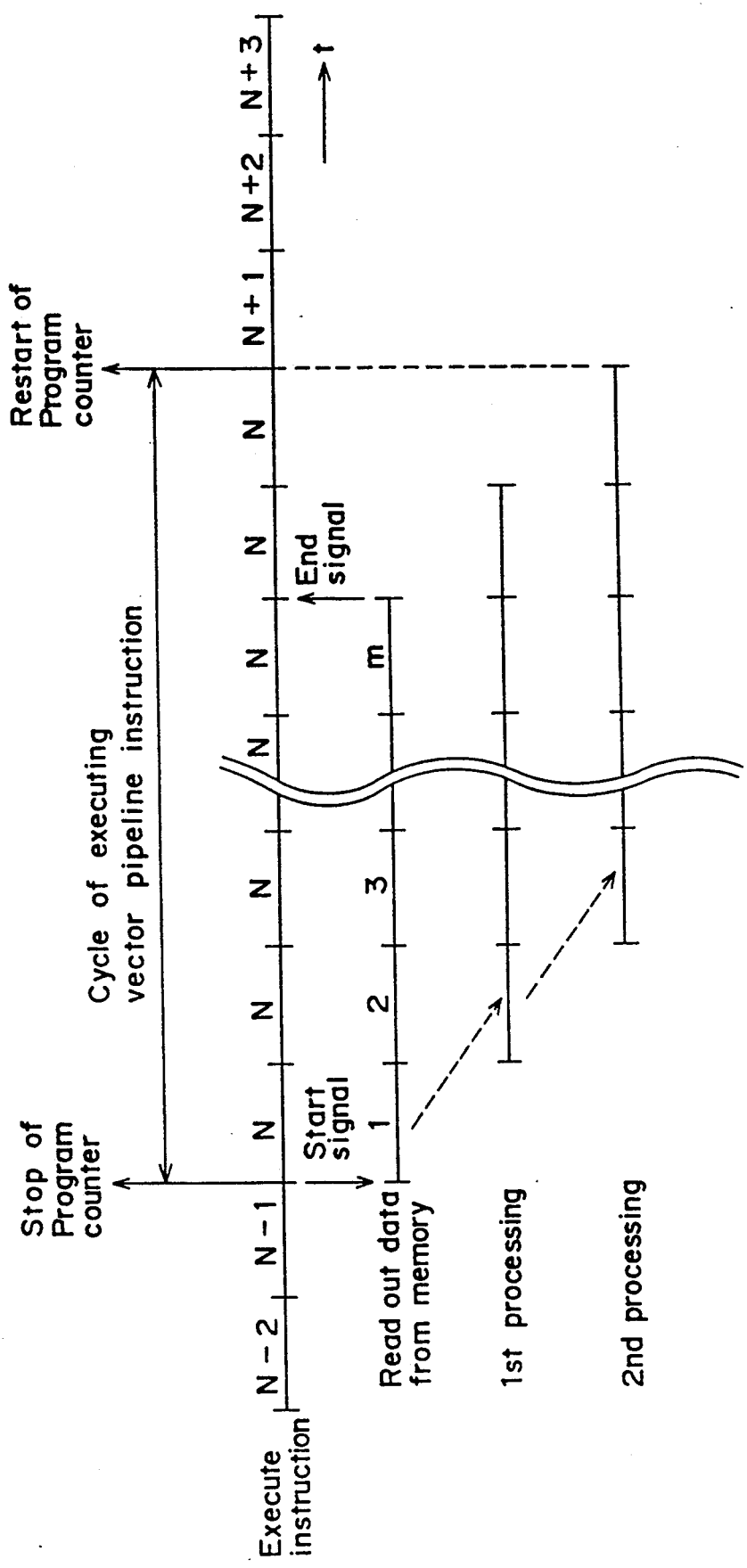
FIG. 2 is a timing chart showing a fundamental operation of the program control type processor shown in FIG. 1.

In FIG. 2, each of instructions other than an instruction of the N-th address is the conventional instruction for executing only one operation (referred to as a one operation instruction hereinafter) and is not a branching instruction. In order to further simplify the explanation of the operation of the processor, omitted cycles required for instructions of fetch, decode etc., have been omitted and only execution cycles are shown in FIG. 2. It takes one cycle to execute the conventional one operation instruction other than the instruction of the N-th address, normally, by controlling respective circuits of the processor as well as the conventional processor. Upon executing the conventional one operation instruction, instructions are sequentially read out one by one so as to execute the read instructions. In cycles of executing instructions of the (N−2)-th and (N−1)-th addresses shown in FIG. 2, the conventional one operation instructions are executed.

Figure 4:
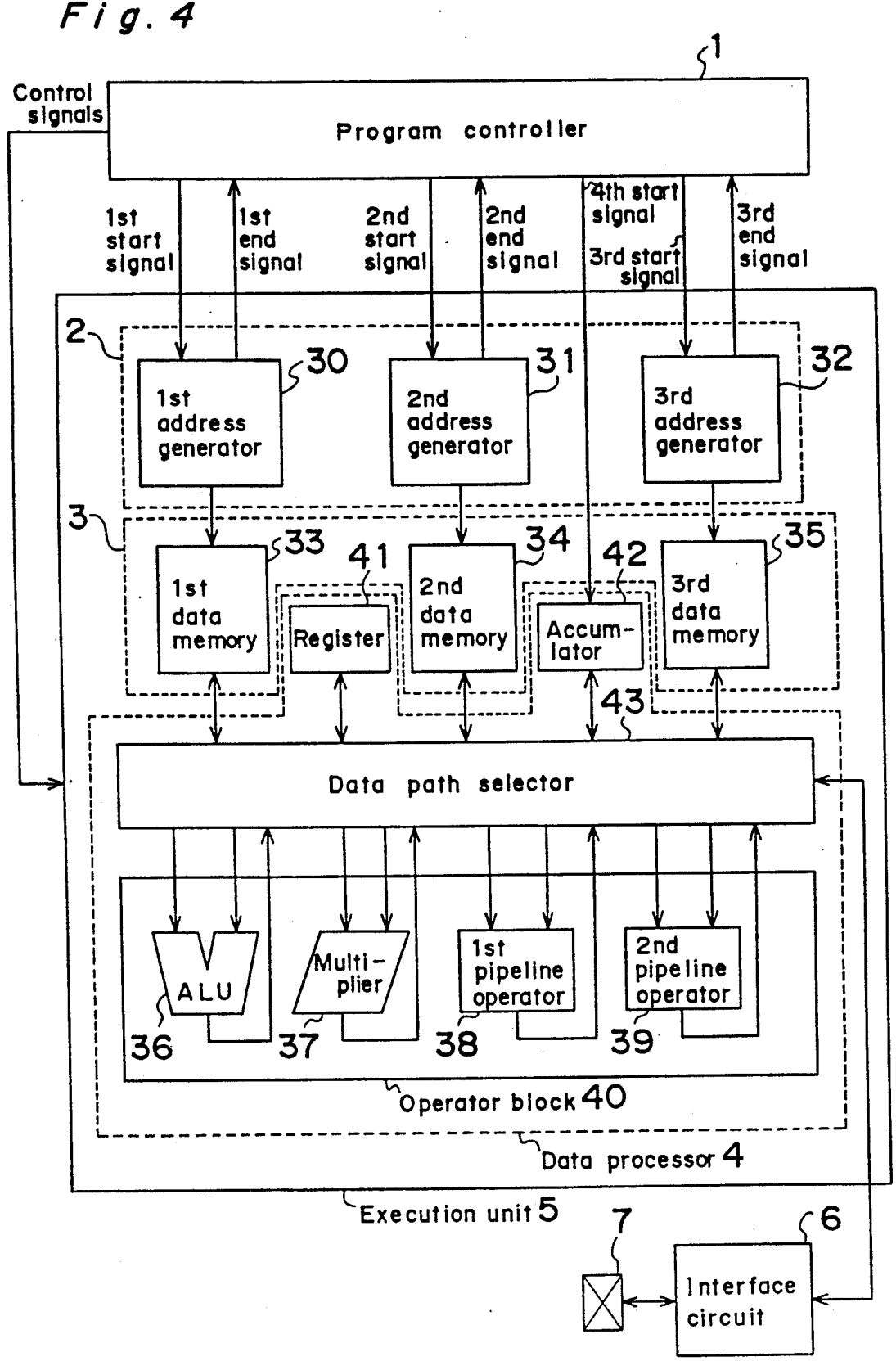
FIG. 4 is a schematic block diagram showing an execution unit shown in FIG. 1.

Thereafter, when a vector pipeline instruction of the N-th vector pipeline instruction including instructions for reading out data from a memory, executing a first processing and executing a second processing is read out from the program memory 11 and decoded by the decoder 12, first of all, the program counter 10 which is provided in the program controller 1 is stopped, and the operation of each execution cycle of the vector pipeline instruction is repeated. On the other hand, the start signal is inputted from the program controller 1 to the address generator 2, and then, the address generator 2 sequentially generates plural m addresses according to a preset sequence from a cycle when the start signal is inputted thereto. Cycles of reading out plural m data from the data memory 3 are started as shown in FIG. 2. On the other hand, the program controller 1 controls the data processor 4 to process data according to the contents of the vector pipeline instruction. It is to be noted that the data processor 4 includes plural operators 36 to 39, a register 41, data memories 33 to 35 and a data path selector 43 for selecting data to be inputted and outputted, as shown in FIG. 4.

According to the control described above, the instructions of reading out data from the program memory 11, executing a first processing and executing a second processing are executed for plural m data. As soon as the address generator 2 completes generation of the plural m addresses, the address generator 2 outputs an end signal to the program controller 1. At that time, the program controller 1 has already decoded the present vector pipeline instruction of three stages including the instructions of reading out data from a memory, executing a first processing and executing a second processing, and stores this instruction information therein. Two cycles after receiving the end signal from the address generator 2, namely after all the instructions of the vector pipeline cycle are completed, the program controller 1 restarts the program counter 10 using the instruction information. Thereafter, the program controller 1 executes instructions to be executed after the vector pipeline instruction of the N-th address, namely, executes instructions of the (N+1)-th, (N+2)-th and (N+3)-th addresses.

As described above, there can be obtained a program control type processor comprising the new vector pipeline instruction which is capable of executing a pipeline parallel process. The program control type processor of the present preferred embodiment can execute instructions using the pipeline parallel process at a higher speed, and also can decrease a memory capacity of the program memory 11, as compared with the conventional processor comprising only conventional sets of instructions.

In response to one instruction of the N-th address, the processor shown in FIG. 1 executes and controls the pipeline parallel process of three stages including instructions of reading out plural m data from the program memory 11, executing a first processing and executing a second processing, only for (m+2) cycles. If these instructions are executed using the conventional one operation instruction, it takes at least 3m cycles to execute these instructions. Therefore, the processor of the present preferred embodiment can execute these instructions at a speed which is three times speed of the conventional processor. If the number of stages of the pipeline process is increased, instructions can be executed at a higher speed, easily.

FIG. 3 shows a detailed composition of the program controller 1 shown in FIG. 1.

Referring to FIG. 3, the program controller 1 mainly comprises a program counter 10, a program memory 11, a decoder 12, a vector instruction controller 13, a first pipeline register 15, an instruction register circuit 16 including a second pipeline register 14 and a second multiplexer 21, and a branch address controller 20. The program counter 10 comprises a program counter register 17, a first multiplexer 18 and an incrementer 19.

An instruction which is addressed by the program counter 10 is read out from the program memory 11, and the read instruction is transferred through the second multiplexer 21 and the second pipeline register 14 to the decoder 12. The decoder 12 decodes the transferred instruction and outputs control signals of the decoded result through the first pipeline register 15 to respective circuits of the execution unit 5. Thus, there is constituted a pipeline architecture including a cycle of reading out data from the program memory 11, a cycle of decoding an instruction and a cycle of executing the decoded instruction.

In response to a first control signal outputted from the vector instruction controller 13, the first multiplexer 18 selects either an output of the incrementer 19 which is provided for increasing an address outputted from the program counter register 17 by one so as to generate continuous addresses, or an output of the branch address controller 20 or an output of the program counter register 17, and outputs the selected output through the program counter register 17 to the program memory 11. Further, in response to a second control signal outputted from the vector instruction controller 13, the second multiplexer 21 selects either an output of the program memory 11 or an output of the second pipeline register 14, and outputs the selected output through the second pipeline register 14 to the decoder 12.

In response to a control signal outputted from the decoder 12, the vector instruction controller 13 controls switching operations of the first and second multiplexers 18 and 21, and outputs start signals to the execution unit 5 and receives an end signal from the execution unit 5 as described in detail later.

When the program controller 1 sequentially reads out instructions from the program memory 11, the vector pipeline instruction is decoded by the decoder 12, and then, the vector instruction controller 13 outputs start signals to the execution unit 5. Then, simultaneously, the vector instruction controller 13 controls the first multiplexer 18 to select the output of the program counter register 17 so that the program counter register 17 self-holds data. Further, the vector instruction controller 13 controls the second multiplexer 21 to select the output of the second pipeline register 14 so that the second pipeline register 14 self-holds data. Then, respective instructions of the vector pipeline instruction are sequentially executed continuously for plural cycles.

It is to be noted that, as means for self-holding data in the program counter 17 and the second pipeline register 14, a write clock for each of the program counter register 17 and the second pipeline register 14 may be directly stopped.

Thereafter, when the vector instruction controller 13 receives the end signal from the execution unit 5, the vector instruction controller 13 cancels the control for the first and second multiplexers 18 and 21 a predetermined number of cycles after receiving the end signal, wherein the number of the cycles is predetermined depending on the contents of the above-mentioned vector pipeline instruction. As a result, the self-holding of the program counter register 17 and the second pipeline register 14 is canceled. Thereafter, instructions to be executed after the vector pipeline instruction are sequentially executed.

Furthermore, when a branch address instruction is decoded by the decoder 12, the branch address controller 20 generates a branch address according to the contents of the branching address instruction and outputs it to the first multiplexer 18.

FIG. 4 shows a detailed composition of the execution unit 5 shown in FIG. 1.

Referring to FIG. 4, the execution unit 5 comprises the address generator 2 including first, second and third address generators 30, 31 and 32, the data memory 3 including first, second and third data memories 33, 34 and 35, and the data processor 4. The first and second address generators 30 and 31 generate addresses for the first and second data memories 33 and 34, respectively, and data read out from the first and second data memories 33 and 34 are processed by a predetermined arithmetic process by the data processor 4. The address generator 32 generates an address for the third data memory 35, and data processed by the data processor 4 are written in the third data memory 35.

The data processor 4 comprises an operator block 40 including an arithmetic and logic unit (referred to as an ALU hereinafter) 36, a multiplier 37, and first and second pipeline operators 38 and 39. The data processor 4 further comprises a register 41, an accumulator 42 and a data path selector 43 which is connected to the first, second and third memories 33, 34 and 35, the register 41, the accumulator 42, the ALU 36, the multiplier 37, and the first and second pipeline operators 38 and 39. The data path selector 43 is provided for switching data paths through which data are inputted from the connected circuits and are outputted to the connected circuits. Furthermore, control signals outputted from the program controller 1 are inputted to respective circuits of the address memory 2, the data memory 3 and the data processor 4.

In the execution unit 5 constructed as described above, when a conventional instruction is executed, a function of one operation instruction is selected and data paths are selected by the data path selector 43 so that the conventional instruction can be executed for one cycle.

Further, when the above-mentioned vector pipeline instruction is executed, the first and second data memories 33 and 34 are respectively used as source memories, and the third memory 35 is used as a destination memory. In this case, a function of the execution unit 5 is selected and data paths are selected so that the outputs of the first and second source data memories 33 and 34 are inputted to the operator block 40 and the output of the operator block 40 is inputted to the third destination data memory 35 or the accumulator 42.

Thereafter, when the first and second start signals are inputted from the program controller 1 to the first and second address generators 30 and 31 for generating addresses of the first and second source memories 33, respectively, the first and second address generators 30 and 31 start generating a series of addresses using a preset sequence independent of the program controller 1. In response to the generated addresses, a series of vector data is read out from the source data memories 33 and 34, and is inputted through the data path selector 43 to the operator block 40. Then, the operator block 40 sequentially processes the inputted data by a predetermined arithmetic process.

When a third start signal is inputted from the program controller 1 to the third address generator 32 for generating an address of the destination data memory 35 at a timing delayed by cycles of a number obtained by subtracting one from the number of the pipeline architecture of the execution unit 5 from the first and second start signals, the third address generator 32 starts generating a series of addresses, and then, the vector data of the calculated result outputted from the operator block 40 are written into the destination data memory 35. Otherwise, when a fourth start signal is inputted from the program controller 1 to the accumulator 42, the accumulator 42 starts accumulation of the vector data outputted from the operator block 40.

When the vector pipeline operation is executed for plural cycles as described above and the first address generator 30 completes generation of a predetermined number of addresses, the first address generator 30 generates and outputs and end signal to the program controller 1.

In the above-mentioned preferred embodiment, the first and second data memories 33 and 34 are used as source data memories and the third data memory 35 is used as a destination data memory. However, the present invention is not limited to this. The combination of data memories may be altered. Further, in the above-mentioned preferred embodiment, the first address generator 30 generates the end signal. However, the present invention is not limited to this. Another address generator may generates the end signal.

Figure 5:
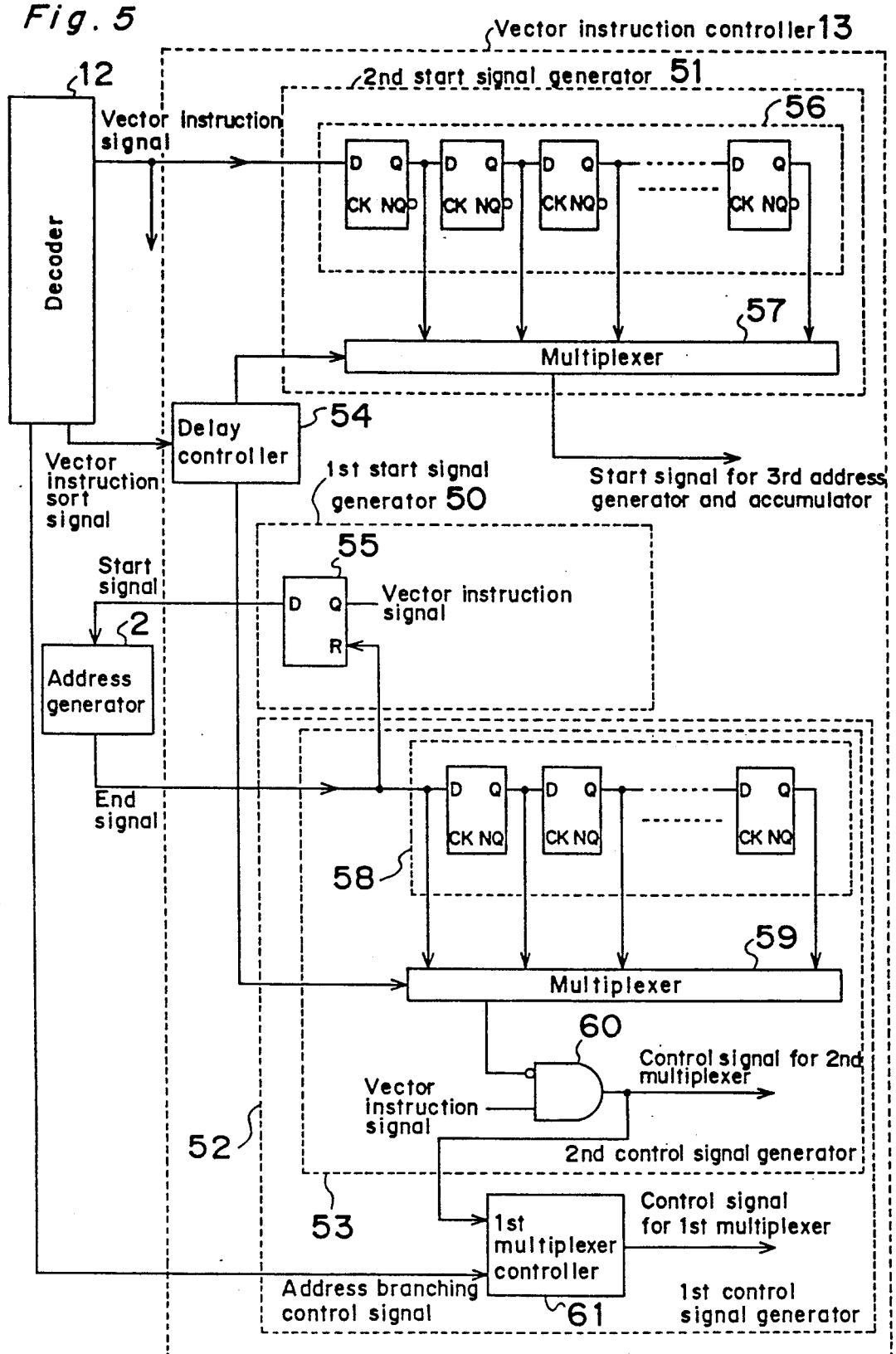
FIG. 5 is a schematic block diagram showing a vector instruction controller shown in FIG. 1.

FIG. 5 shows a detailed composition of the vector instruction controller 13 shown in FIG. 3. Referring to FIG. 5, the vector instruction controller 13 comprises a first start signal generator 50 for generating a start signal for the address generator 2 for the source memory, a second start signal generator 51 for generating the third start signal for the third address generator 32 and for generating the fourth start signal for the accumulator 42, a first signal generator 52 including a second control signal generator and a first multiplexer controller 61, and a vector instruction delay controller 54.

In response to a vector instruction signal outputted from the decoder 12 when the decoder 12 decodes a vector pipeline instruction, the first start signal generator 50 including an SR type flip-flop 55 sets a start signal for the address generator 2 for the source memory and outputs the generated start signal to the address generator 2. Further, in response to the end signal outputted from the address generator 2, the first start signal generator 50 resets the start signal for outputting to the address generator 2.

The second start signal generator 51 comprises a shift register 56 having plural stages of delay type flip-flops each delaying the vector instruction signal by one cycle of the operation clock, and a multiplexer 57 for selecting one of outputs of the plural flip-flops of the shift register 56 and for outputting the selected output to the third address generator 32 and the accumulator 42 as the third and fourth start signals, respectively. When the decoder 12 outputs the above-mentioned vector instruction signal, the decoder 12 decodes the kind of vector pipeline instruction and outputs a vector instruction sort signal of the decoded result to the vector instruction delay controller 54. In response to the vector instruction sort signal, the vector instruction delay controller 54 determines a necessary delay amount in the shift register 56 and outputs a control signal for indicating the determination result to the multiplexer 57, thereby controlling the multiplexer 57 to select an appropriate one of the outputs of the plural flip-flops of the shift register 56 and to output it to the third address generator 32 and the accumulator 42.

The second control signal generator 53 comprises a shift register 58 having plural stages of delay type flip-flops each delaying the end signal outputted from the address generator 2 by one cycle of the operation clock, a multiplexer 59 for selecting one of outputs of the plural flip-flops of the shift register 58 and for outputting the selected output, and an AND gate 60. The output of the multiplexer 59 is inputted to an inverted input terminal of the AND gate 60, and the above-mentioned vector instruction signal outputted from the decoder 12 is inputted to another input terminal of the AND gate 60. The AND gate 60 outputs the second control signal to the second multiplexer 21 and the first multiplexer controller 61. In response to the vector instruction sort signal., the vector instruction delay controller 54 also determines a necessary delay amount in the shift register 58 and outputs a control signal for indicating the determination result to the multiplexer 59, thereby controlling the multiplexer 59 to select an appropriate one of the outputs of the plural flip-flops of the shift register 58 and to output it to the AND gate 60.

In response to the vector instruction signal, the AND gate 60 sets the second control signal for the second multiplexer 21. Further, in response to the output of the multiplexer 59, the AND gate 60 resets the second control signal.

When the vector pipeline instruction is executed, the second multiplexer 21 shown in FIG. 3 is controlled in response to the second control signal so that the pipeline register 14 self-holds data. On the other hand, when an instruction other than the vector pipeline instruction is executed, the second multiplexer 21 is controlled in response to the second control signal to select the output of the program memory 11.

Further, when the decoder 12 decodes an address branching instruction, the decoder 12 outputs an address branching control signal to the first multiplexer controller 61. In response to the second control signal for the second multiplexer 21 outputted from the AND gate 60 and the address branching control signal outputted from the decoder 12, the first multiplexer controller 61 generates and outputs the first control signal to the first multiplexer 18.

When the vector pipeline instruction is executed, the first multiplexer 18 shown in FIG. 3 is controlled in response to the first control signal so that the program counter register 17 self-holds data. On the other hand, when an instruction other than the vector pipeline instruction is executed, the first multiplexer 18 is controlled in response to the first control signal to select the output of the incrementer 19 or the branching address controller 20.

Figure 6:
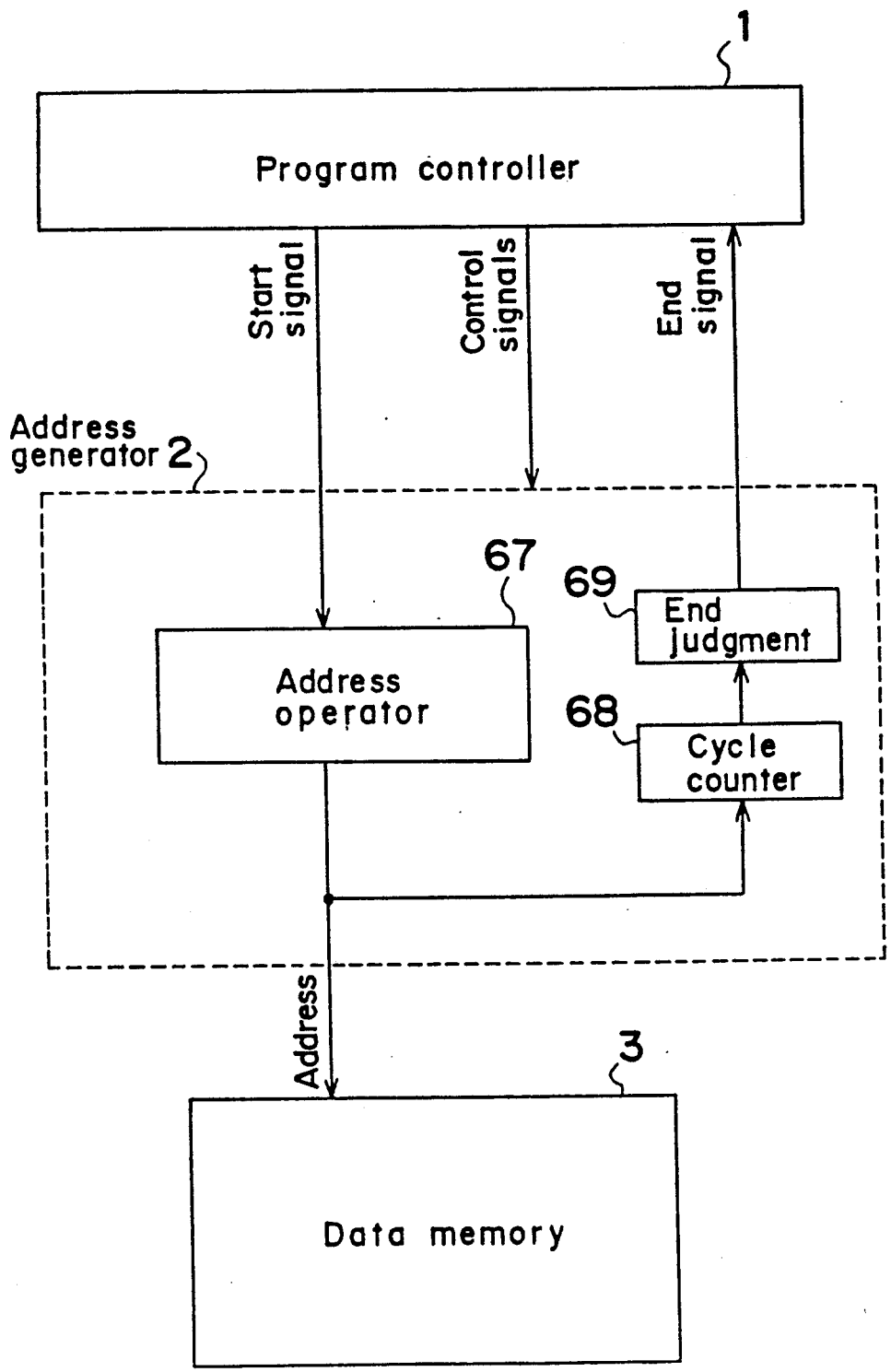
FIG. 6 is a schematic block diagram showing an address generator shown in FIG. 5.

FIG. 6 shows a detailed composition of the address generator 2 shown in FIG. 5. Referring to FIG. 6, the address generator 2 comprises an address operator 67, a cycle counter 68, and an end judgment circuit 69. The address operator 67 is constituted by a conventional pointer or a two dimensional address operator which are well known to those skilled in the art.

For a time interval when there is set the start signal outputted from the vector instruction controller 13 of the program controller 1 in the case where the vector pipeline instruction is executed, the address operator 67 sequentially generates addresses of the data memory 3 in response to the start signal. At the same time, the cycle counter 68 counts the number of addresses generated by the address operator 67, and outputs data of the counted number of addresses to the end judgment circuit 69. When the counted number of addresses becomes a predetermined value, the end judgment circuit 69 outputs the end signal to the vector instruction controller 13 of the program controller 1.

On the other hand, in the case where an instruction other than the vector pipeline instruction is executed, the address operator 67 is controlled in response to a control signal outputted from the decoder 12 of the program controller 1 so as to generate addresses of the data memory 3 one by one.

The program control type processor of the present preferred embodiment has the vector pipeline instructions in addition to the conventional sets of instructions, and comprises the program controller 1 shown in FIG. 3 and the execution unit 5 shown in FIG. 4. In the program type processor, there is provided the following vector pipeline instructions:

(a) a first type vector pipeline instruction for reading out vector data from the first and second data memories (source data memories) 33 and 34, performing a pipeline parallel calculation using the following equation (1) in the first pipeline operator 38 of the operation block 40 in response to the read vector data, and writing vector data of the operation result outputted from the first pipeline operator 38 into the third data memory (destination data memory) 35, $$Y_i = F(A_i, B_i), i = 1, 2, 3, \ldots, m, \quad (1)$$

where F is a calculation function of the operator block 40,
Ai and Bi are vector data read out from the source data memories 33 and 34, respectively,
m is a natural number which is the number of each of the vector data Ai and Bi, and
Yi is vector data calculated by the operator block 40; and (b) a second type vector pipeline instruction for reading out vector data from the second and third data memories 34 and 35, performing a pipeline parallel calculation using the following equation (2) in the ALU 36 of the operator block 40 in response to the read vector data, and making the accumulator 10 accumulate the vector data of the calculation result outputted from the ALU 36, $$X = \sum_{i=1}^{m} F(A_i, B_i), \quad (2)$$

where X is vector data which is calculated by the accumulator 42.

Figure 7:
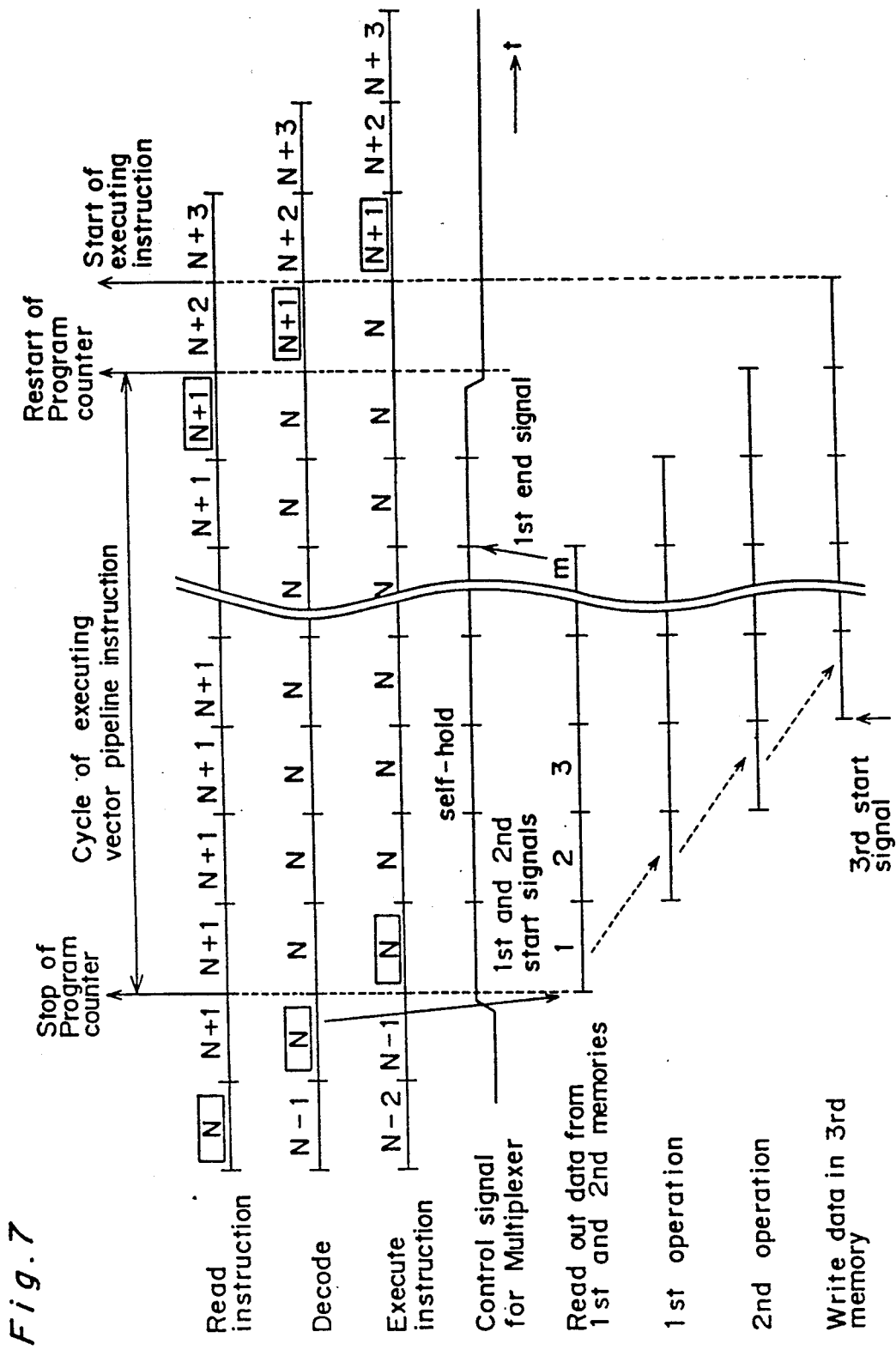
FIG. 7 is a timing chart showing a processing of a first type vector pipeline instruction of the program control type processor shown in FIG. 1.

FIG. 7 is a timing chart showing a processing of the first type vector pipeline instruction of the program control type processor.

In FIG. 7, there is shown the first type vector pipeline instruction of the N-th address, and each of instructions other than the instruction of N-th address is one of the conventional one operation instruction but is not a branching instruction. In FIG. 7, it is shown that each instruction of an address is executed in each of an instruction reading cycle, a decode cycle and an instruction execution cycle, and there is further shown operation timings of respective circuits when the first type vector pipeline instruction is executed.

As is apparent from FIG. 7, each of the conventional one operation instructions such as an ALU operation, a multiplication, a load of one data unit, a store of one data unit etc. is executed in a manner similar to that of the conventional program control type processor. Namely, a cycle of reading out an instruction from the program memory 11, a cycle of decoding the instruction and a cycle of executing the instruction are sequentially executed with a pipeline processing. In this case, in the execution unit 5, according to the contents of a one operation instruction decoded by the decoder 12, data paths are selected by the data path selector 43, and then, the processing of each instruction is completed for one cycle.

As shown in FIG. 7, the conventional one operation instructions of the (N−2)-th and (N−1)-th addresses are executed. Thereafter, the first type vector pipeline instruction is read out from the program memory 11 and is executed as follows.

In the execution unit 5, first of all, according to the contents of the first type vector pipeline instruction decoded by the decoder 12, data paths are selected by the data path selector 43 so that the outputs of the source data memories 33 and 34 are inputted to the first pipeline operator 38 and the output of the first pipeline operator 38 is inputted to the destination data memory 35.

In the present preferred embodiment, the first pipeline operator 38 has a pipeline architecture of two stages. For example, in order to perform an image processing, there may be provided in the execution unit 5, a pipeline operator for exclusive use such as a filtering operator, or digital cosine transformer. In this case, a processing speed of the processor becomes, for example, ten times or one hundred times that of the conventional processor, depending on a parallel number of the pipeline architecture.

Referring to FIG. 7, when the vector pipeline instruction of the N address is decoded by the decoder 12, the vector instruction controller 13 outputs the first and second control signals to the first and second multiplexers 18 and 21, respectively. Then, the first multiplexer 18 selects the output of the program counter register 17 and the program counter register 17 self-holds data. On the other hand, the second multiplexer 21 selects the output of the first pipeline register 14 and the first pipeline register 14 self-holds data. In this case, as shown in FIG. 7, respective instructions of the vector pipeline instruction are sequentially executed for plural cycles.

When the vector pipeline instruction is decoded by the decoder 12, the vector instruction controller 13 of the program controller 1 generates and outputs the first and second start signals to the first and second address generators 30 and 31, respectively. Then, each of the address generators 30 and 31 generates plural m addresses for continuous cycles with a preset sequence, independent of the program controller 1, and then, there is executed plural continuous m cycles of reading out vector data from the first and second data memories 33 and 34. In the present preferred embodiment, the first pipeline operator 38 having the pipeline architecture of two stages performs the pipeline operation composed of the first and second operations shown in FIG. 7, and vector data of the operation result outputted from the first pipeline operator 38 are inputted to the third data memory 35, and are written therein.

When the third start signal is generated and inputted from the vector instruction controller 13 of the program controller 1 to the third address generator 32 for generating an address of the destination data memory 35 at a timing delayed by cycles of a number obtained by subtracting one from the number of stages of the pipeline architecture of the execution unit 5, namely, by three cycles of the first and second operations and the write operation, from the first and second start signals, the third address generator 32 starts generating a series of addresses, which is continuously written into the destination data memory 35. At that time, the program controller 1 has already decoded the vector pipeline instruction of the N-th address and obtained such information that the vector pipeline instruction is an instruction for executing a pipeline processing of four stages composed of cycles of reading out data from memories, the first and second operations, and writing data in the memory. The third start signal to be outputted to the address generator 32 is delayed by three cycles from the first and second starts signals to be respectively outputted to the first and second address generators 30 and 31.

As described above referring to FIG. 7, the pipeline processing of four stages composed of cycles of reading out data from memories, the first and second operations, and writing data in the memory can be executed for respective plural m vector data, sequentially.

Thereafter, when the first address generator 30 completes generation of plural m addresses, the first address generator 30 outputs the first end signal to the vector instruction controller 13 of the program controller 1. At a timing delayed by predetermined number of cycles depending on the contents of the processing of the vector pipeline instruction of the N-th address after receiving the first end signal, the vector instruction controller 13 resets the first and second control signals for the first and second multiplexers 18 and 21, thereby canceling the self-holding of the program counter register 17 and the self-holding of the second pipeline register 14. Then, the program counter 10 and the second pipeline register 14 are restarted.

In the vector pipeline instruction of the N-th address, the above-mentioned predetermined number of cycles is set at two cycles. Since the program controller 1 has already decoded the vector pipeline instruction of the present N-th address and obtained such information that the vector pipeline instruction is an instruction for executing a pipeline processing of four stages composed of cycles of reading out data from memories, the first and second operations, and writing data in the memory as described above, the program controller 1 can reset the first and second control signals for the multiplexers 18 and 21 using this information, at a timing delayed by the above-mentioned predetermined number of cycles (two cycles in the preferred embodiment) from a timing when receiving the above-mentioned first end signal. The reason why the above-mentioned predetermined number of cycles are not set at three cycles and are set at two cycles is to execute one instruction of the N-th address for one cycle by the pipeline architecture of the program controller 1 even though the first and second control signals are reset.

At a timing delayed by one cycle from a timing when the program counter 10 and the second pipeline register 14 are restarted, all the processes relating to the vector pipeline instruction of the N-th address is completed; in other words, the cycle of executing the vector pipeline instruction is finished. Thereafter, instructions such as the instructions of the (N+1)-th and (N+2)-th addresses which follows the vector pipeline instruction of the N-th address are sequentially executed in a manner similar to that of the conventional program control type processor.

As described above, the pipeline parallel operation represented by the equation (1) can be executed according to the above-mentioned vector pipeline instruction, and then, a processing speed can be improved so as to become about ten times or one hundred times that of the conventional program control type processor. Further, plural steps of the program memory 11 can be compressed to one step by using the vector pipeline instruction.

Figure 8:
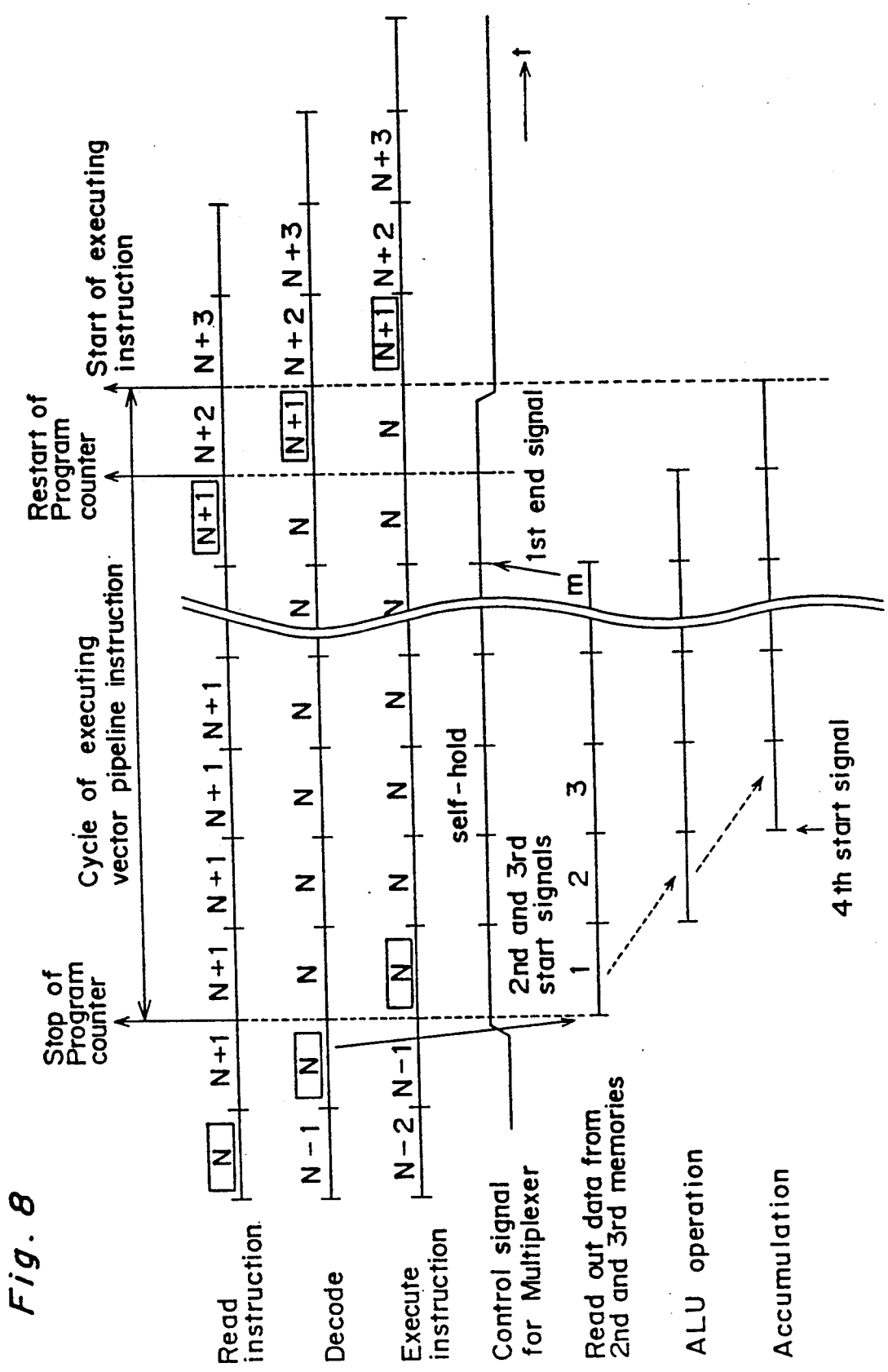
FIG. 8 is a timing chart showing a processing of a second type vector pipeline instruction of the program control type processor shown in FIG. 1.

FIG. 8 is a timing chart showing a processing of the above-mentioned second type vector pipeline instruction of the program control type processor.

In FIG. 8, there is shown the second type vector pipeline instruction of the N-th address, and each of instructions other than the instruction of the N-th address is one of the conventional one operation instructions but is not a branching instruction. In FIG. 8, it is shown that each instruction of an address is executed in each of an instruction reading cycle, a decode cycle and an instruction execution cycle, and there is further shown operation timings of respective circuits when the second type vector pipeline instruction is executed.

As is apparent from FIG. 8, each of the conventional one operation instructions such as an ALU operation, a multiplication, a loading of one data unit, a storing of one data unit, etc. is executed in a manner similar to that of the conventional program control type processor.

As shown in FIG. 8, the conventional one operation instructions of the (N−2)-th and (N−1)-th addresses are executed. Thereafter, the second type vector pipeline instruction is read out from the program memory 11 and is executed as follows.

In the execution unit 5, first of all, according to the contents of the second type vector pipeline instruction decoded by the decoder 12, data paths are selected by the data path selector 43 so that the outputs of the source data memories 33 and 34 are inputted to the ALU 36 and the output of the ALU 36 is inputted to the accumulator 42.

Referring to FIG. 8, when the vector pipeline instruction of the N address is decoded by the decoder 12, the vector instruction controller 13 outputs the first and second control signals to the first and second multiplexers 18 and 21, respectively. Then, the first multiplexer 18 selects the output of the program counter register 17 and the program counter register 17 self-holds data. On the other hand, the second multiplexer 21 selects the output of the first pipeline register 14 and the first pipeline register 14 self-holds data. In this case, as shown in FIG. 8, respective instructions of the vector pipeline instruction are sequentially executed for plural cycles.

When the vector pipeline instruction is decoded by the decoder 12., the vector instruction controller 13 of the program controller 1 also generates and outputs the second and third start signals to the second and third address generators 31 and 32, respectively. Then, each of the address generators 31 and 32 generates plural m addresses for continuous cycles with a preset sequence independent of the program controller 1, and then, there is executed plural continuous m cycles of reading out vector data from the second and third data memories 34 and 35. In the present preferred embodiment, the ALU 36 performs a predetermined ALU operation, and vector data of the operation result outputted from the ALU 36 are inputted to the accumulator 42.

When the fourth start signal is generated and inputted from the vector instruction controller 13 of the program controller 1 to the accumulator 42 at a timing delayed by cycles of a number obtained by subtracting one from the number of stages of the pipeline architecture of the execution unit 5, namely, by two cycles of the ALU operation and the accumulation, from the second and third start signals, the accumulator 36 starts accumulation of the vector data. At that time, the program controller 1 has already decoded the vector pipeline instruction of the N-th address and obtained such information that the vector pipeline instruction is an instruction for executing a pipeline processing of three stages composed of cycles of reading out data from memories, the ALU operation and the accumulation. The fourth start signal to be outputted to the accumulator 42 is generated at a timing delayed by two cycles from the second and third start signals to be respectively outputted to the second and third address generators 31 and 32.

As described above referring to FIG. 8, the pipeline processing of three stages composed of cycles of reading out data from memories, the ALU operation and the accumulation can be executed for respective plural m vector data, sequentially.

Thereafter, when the second address generator 31 completes generation of plural m addresses, the second address generator 31 outputs the second end signal to the vector instruction controller 13 of the program controller 1. At a timing delayed by predetermined cycles depending on the contents of the processing of the vector pipeline instruction of the N-th address after receiving the second end signal, the vector instruction controller 13 resets the first and second control signals for the first and second multiplexers 18 and 21, thereby canceling the self-holding of the program counter register 17 and the self-holding of the second pipeline register 14. Then, the program counter 10 and the second pipeline register 14 are restarted.

In the vector pipeline instruction of the N-th address, the above-mentioned predetermined number of cycles is set at one cycle. Since the program controller 1 has already decoded the vector pipeline instruction of the present N-th address and obtained such information that the vector pipeline instruction is an instruction for executing a pipeline processing of three stages composed of cycles of reading out data from memories, the ALU operation and the accumulation as described above, the program controller 1 can reset the first and second control signals for the multiplexers 18 and 21 using this information, at a timing delayed by the above-mentioned predetermined number of cycles (one cycle in the preferred embodiment) from a timing when receiving the above-mentioned second end signal. The reason why the above-mentioned predetermined number of cycles is not set at two cycles and is set at one cycle is to execute one instruction of the N-th address for one cycle by the pipeline architecture of the program controller 1 even though the first and second control signals are reset.

At a timing delayed by one cycle from a timing when the program counter 10 and the second pipeline register 14 are restarted, all the processes relating to the vector pipeline instruction of the N-th address is completed; in other words, the cycle of executing the vector pipeline instruction is finished. Thereafter, instructions such as the instructions of the (N+1)-th and (N+2)-th addresses which follows the vector pipeline instruction of the N-th address are sequentially executed in a manner similar to that of the conventional program control type processor.

As described above, the pipeline parallel operation represented by the equation (2) can be executed according to the above-mentioned vector pipeline instruction, and then, a processing speed can be improved so as to become about ten times or one hundred times that of the conventional program control type processor. Further, plural steps of the program memory 11 can be compressed to one step by using the vector pipeline instruction. Namely, a memory capacity of the program memory can be decreased.

It is to be noted that the address generator 2 may be a two dimensional address generator for generating addresses of a rectangular area of a data memory at which two dimensional data are stored, wherein the two dimensional address generator is disclosed in Japanese patent application No. 2-41424. In this case, for example, image data having a two dimensional data architecture can be efficiently processed.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A program control type vector processor for executing plural instructions including a vector pipeline instruction, comprising:

a data processor for executing a pipeline operation for vector data comprised of a series of data based on said vector pipeline instruction;

a program controller including a program memory, a program counter and a decoder, said program controller stopping said program counter and outputting a start signal when said vector pipeline instruction is read out from said program memory and is decoded by said decoder, and thereafter, controlling an operation of said data processor according to contents of said vector pipeline instruction;

an address generator for sequentially generating addresses according to a preset sequence in response to said start signal and for outputting an end signal to said program controller when completing generation of a predetermined number of addresses; and a data memory for storing data and outputting vector data comprised of said series of data based on an address generated by said address generator;

wherein said data processor executes said pipeline operation for the vector data outputted from said data memory under the control of said program controller;

and wherein said program controller detects completion of said pipeline operation performed in response to said vector pipeline instruction a predetermined number of cycles after receiving said end signal, and thereafter, restarts said program counter, sequentially executes instructions following said vector pipeline instruction;

said program controller further comprising:

a branch address controller for generating a branch address in response to a decoded result of said decoder;

a vector instruction controller for controlling respective circuits of said program controller in response to said decoded result of said decoder and said end signal;

an instruction register circuit for temporarily storing data outputted from said program memory in response to a second control signal outputted from said vector instruction controller; and a first pipeline register for temporarily storing data outputted from said decoder and outputting the stored data to said data memory and said data processor;

said program counter comprising:

a counter register for temporarily storing an address to be outputted to said program memory;

an incrementer for increasing by one an address outputted from said program counter register every one cycle of an operation clock and for outputting the increased address; and a first multiplexer for selecting either one of outputs of said branch address controller, said program counter register and said incrementer according to a first control signal outputted from said vector instruction controller and for outputting said selected address through said program counter register to said program memory;

said instruction register circuit comprises:

a second pipeline register for temporarily storing data to be outputted to said decoder; and a second multiplexer for selecting either one of outputs of said program memory and said second pipeline register according to a second control signal outputted from said vector instruction controller and for outputting said selected one through said second pipeline register to said decoder;

wherein when said vector pipeline instruction is decoded by said decoder, said vector instruction controller outputs said start signal to said address generator, controls said first multiplexer to select the output of said program counter register so that said program counter register holding data, and controls said second multiplexer to select the output of said second pipeline register so that said second pipeline register holding said data, thereby controlling said address generator, said data memory and said data processor to sequentially execute respective instructions of said vector pipeline instruction, thereafter, at a timing delayed by predetermined cycles from a timing when receiving said end signal from said address generator, said vector instruction controller detects completion of said pipeline operation performed based on said vector pipeline instruction, and then, said vector instruction controller stops the control of said first and second multiplexers, thereby stopping said holding of said program counter register and said holding of said second pipeline register, and thereafter, said program controller sequentially executes instructions following said vector pipeline instruction;

said address generator comprising a source memory address generator and a destination memory address generator;

said vector instruction controller comprising:

a first start signal generator for setting a start signal for said source memory address generator in response to a vector instruction signal outputted from said decoder when said vector pipeline instruction is decoded by said decoder and for outputting the setting start signal to said source memory address generator, and for resetting said start signal for said source memory address generator in response to said end signal outputted from said address generator;

a second start signal generator including a first shift register having predetermined plural stages of delay circuits for delaying said vector instruction signal and for outputting said delayed vector instruction signal, and a third multiplexer for selecting either one of outputs of said delay circuits of said first shift register according to a vector instruction sort signal of a decoded result which is obtained when said vector pipeline instruction is decoded by said decoder and for outputting the selected one of said outputs of said delay circuits of said first shift register as said start signal for said destination memory address generator;

a first control signal generator including a second shift register having predetermined plural stages of delay circuits for delaying said end signal and for outputting delayed end signal, a fourth multiplexer for selecting either one of outputs of said delay circuits of said second shift register according to said vector instruction sort signal and for outputting said selected one as a delayed end signal, and a signal generating circuit for setting said second control signal in response to said vector instruction signal, and for outputting said set second control signal to said second multiplexer, and for resetting said second control signal in response to said delayed end signal outputted from said fourth multiplexer; and a second control signal generator for generating said first control signal in response to said second control signal and an address branching control signal of a decoded result which is obtained when an address branching instruction is decoded by said decoder, and for outputting said generated first control signal to said first multiplexer.

2. The program control type vector processor as claimed in claim 1, wherein said address generator comprises:

an address operator for sequentially generating addresses in response to said start signal and outputting said generated address to said data memory;

a cycle counter for counting a number of addresses generated by said address operator; and an end judgment circuit for outputting said end signal to said program controller when the number of the address counted by said cycle counter becomes a predetermined value.

* * * * *